3,200,124
10-ACETYL-17,18-DILOWER ALKOXY-SUBSTITUTED - 15,16,17,18,19,20 - HEXADEHYDROYOHIMBANES AND PROCESS FOR THEIR PRODUCTION

John Shavel, Jr., Mendham, Maximilian von Strandtmann, Rockaway, and Chester Puchalski, Morristown, N.J., assignors to Warner-Lambert Pharmaceutical Company, Morris Plains, N.J., a corporation of Delaware
No Drawing. Filed Aug. 19, 1963, Ser. No. 303,125
2 Claims. (Cl. 260—288)

This invention relates to yohimbane alkaloids. More particularly, this invention relates to 10-acetyl-17,18-dilower alkoxy-substituted-15,16,17,18,19,20-hexadehydroyohimbanes and to a novel process for their production. The compounds of this invention may be represented by the following structural formula:

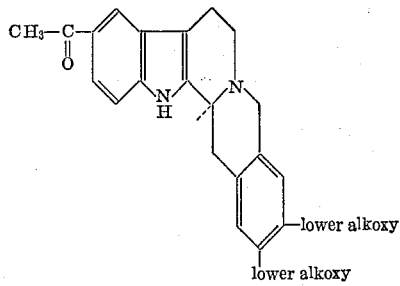

wherein the lower alkoxy group may be methoxy, ethoxy or propoxy, for example.

The compounds of this invention exhibit significant pharmacological activity and are useful in the treatment of hypertension. In addition they are valuable intermediates in the production of other yohimbane alkaloids.

In accordance with this invention, these novel 17, 18 dilower alkoxy substituted yohimbanes are produced by condensing 1-dilower alkoxy substituted 6-acetyl-1,2,3,4-tetrahydro-β-carboline with formaldehyde. The reaction may be expressed by the equation:

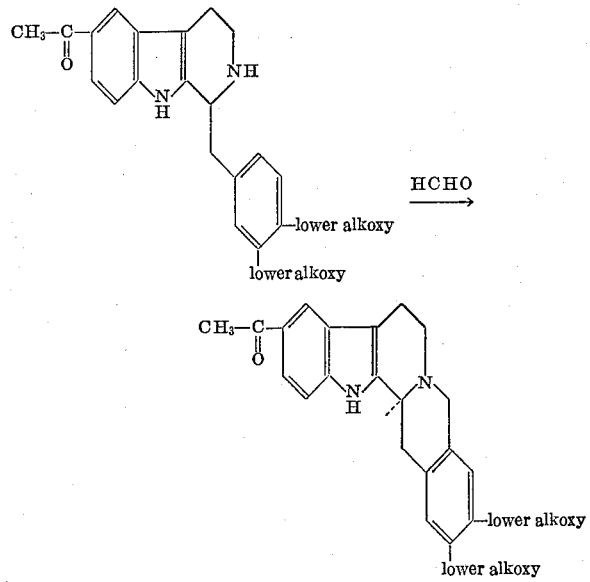

The starting material used in the above reaction is described and prepared in our copending application "1-Substituted-6-Acetyl-1,2,3,4 - Tetrahydro-β-Carbolines," Serial No. 303,143, filed August 19, 1963.

Generally, the above condensation reaction is carried out by heating the selected starting material, preferably in the form of its hydrochloride salt, with an aqueous solution of formaldehyde, such as 37% formaldehyde in water, in the presence of an acid such as acetic acid. Heating is carried out at a temperature of from about 90° to 98° C. for a period of about 60 minutes. The reaction product is recovered from the reaction mixture by precipitating with a base and can then be purified by recrystallization techniques.

The compounds of our invention may be converted into their pharmaceutically acceptable nontoxic acid addition and quaternary ammonium salts by conventional procedures. Examplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following example is included in order further to illustrate the present invention.

EXAMPLE 1

*10-acetyl-17,18-dimethoxy-15,16,17,18,19,20-hexadehydroyohimbane*

A solution of 5.2 g. 6-acetyl-1-3,4-dimethoxybenzyl-1,2,3,4-tetrahydro-β-carboline hydrochloride in 75 ml. 37% formaldehyde and 130 ml. acetic acid is heated on steam for 1 hour, treated with 100 ml. water and basified in the cold with 20% sodium hydroxide solution. The precipitated product is filtered off, and dissolved in acetonitrile. The solution is passed through a 20–30 g. activated magnesium silicate column. Combined eluate and washings are evaporated in vacuo. Residue is recrystallized from acetonitrile to give 10-acetyl-17,18-dimethoxy - 15,16,17,18,19,20 - hexadehydroyohimbane, M.P. 216°–223° C.

Anal. for $C_{23}H_{24}N_2O_3$—Calcd.: C, 73.38; H, 6.42; N, 7.44. Found: C, 73.11; H, 6.68; N, 7.20.

$\lambda$max. 257 m$\mu$, 46,650 287 m$\mu$, $\epsilon$14,750. $\nu$max. 3300 (m), 1660 (s.), 1625 (m.s.), 1592 (m.), 1525 (m.), 855 (m.), 810 (m.) cm.$^{-1}$.

It is to be understood that the foregoing detailed description is given merely by way of illustration and that many variations may be made therein without departing from the spirit of our invention.

Having described our invention, what we desire to secure by Letters Patent is:

1. A member selected from the group consisting of a compound of the formula:

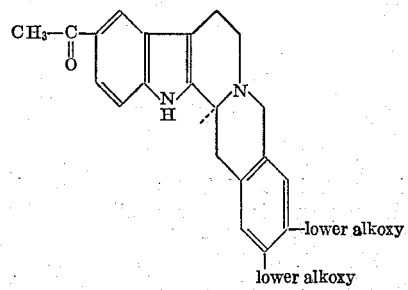

and a nontoxic pharmaceutically acceptable acid addition salt thereof.

2. 10-acetyl-17,18-dimethoxy-15,16,17,18,19,20 - hexadehydro-yohimbane.

References Cited by the Examiner

Buzas et al.: Bull. Soc. Chim. Fr. (1960), pages 1589 and 1590.

Hahn et al.: Berichte, vol. 71 (1938), pages 2192–2197.

WALTER A. MODANCE, *Primary Examiner.*

NICHOLAS S. RIZZO, *Examiner.*